(12) United States Patent
Song et al.

(10) Patent No.: US 9,116,400 B2
(45) Date of Patent: Aug. 25, 2015

(54) LIQUID CRYSTAL DISPLAY HAVING MINIMIZED BEZEL AREA

(75) Inventors: Min-Chul Song, Seoul (KR); JungHoon Yoon, Gyeongsangbuk-dong (KR); Sungman Kim, Seoul (KR); Jae Hwa Park, Gumi-si (KR); YoungJe Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 215 days.

(21) Appl. No.: 13/450,274

(22) Filed: Apr. 18, 2012

(65) Prior Publication Data

US 2013/0093657 A1    Apr. 18, 2013

(30) Foreign Application Priority Data

Oct. 12, 2011    (KR) ........................ 10-2011-0104248

(51) Int. Cl.
| | | |
|---|---|---|
| G02F 1/1345 | (2006.01) | |
| G02F 1/1362 | (2006.01) | |
| G02F 1/136 | (2006.01) | |
| G09G 3/30 | (2006.01) | |
| G09G 3/36 | (2006.01) | |
| G06F 3/038 | (2013.01) | |
| G09G 5/00 | (2006.01) | |

(52) U.S. Cl.
CPC ...... *G02F 1/13454* (2013.01); *G02F 1/136286* (2013.01); *G09G 3/3648* (2013.01); *G09G 2300/0426* (2013.01); *G09G 2310/0281* (2013.01)

(58) Field of Classification Search
CPC ............ G02F 1/1368; G02F 1/136286; G02F 1/13452; G02F 1/1345; G02F 1/13624; G02F 2001/134345; G02F 1/134309; G02F 1/13454; G02F 2001/13456; G09G 2310/027; G09G 2300/0426; G09G 3/3291; G09G 2310/0262; G09G 3/3611; G09G 3/3283; G09G 3/3241; G09G 3/3275; G09G 3/3685; G09G 2310/0272; G09G 2310/0275; G09G 2310/0281; G09G 2310/0267; G09G 2310/0278; G09G 2310/0283; G09G 3/3266; G09G 2310/0297; G09G 2300/0408; G09G 3/3659

See application file for complete search history.

(56) References Cited

U.S. PATENT DOCUMENTS

| | | | |
|---|---|---|---|
| 6,496,238 | B1 | 12/2002 | Greene et al. |
| 6,693,684 | B2 | 2/2004 | Greene et al. |
| 7,573,469 | B2 | 8/2009 | Yamazaki et al. |

(Continued)

FOREIGN PATENT DOCUMENTS

| | | |
|---|---|---|
| KR | 1020060092712 | 8/2006 |
| KR | 1020070077976 | 7/2007 |

*Primary Examiner* — Bumsuk Won
*Assistant Examiner* — Angela Davison
(74) *Attorney, Agent, or Firm* — Innovation Counsel LLP

(57) ABSTRACT

A liquid crystal display includes a first substrate including pixels arranged in m columns by n rows, n data lines disposed, m gate lines arranged substantially parallel to the data lines, n data distribution lines arranged to cross the m gate lines and electrically connected to the data lines, respectively, source driving chips disposed on a first portion of the first substrate, and a gate driver disposed on a second portion of the first substrate. Each of the data distribution lines is connected to a subset of the pixels arranged in a corresponding row, and each of the gate lines is connected to a subgroup of the pixels arranged in a corresponding column. The source driving chips apply data signals to the pixels through the first data lines and the data distribution lines, and the gate driver applies gate signals to the pixels through the gate lines.

17 Claims, 10 Drawing Sheets

(56) References Cited

U.S. PATENT DOCUMENTS

| | | |
|---|---|---|
| 7,663,577 B2 | 2/2010 | Yoon |
| 8,363,192 B2 | 1/2013 | Takahashi et al. |
| 2006/0238463 A1* | 10/2006 | Kim et al. ............ 345/80 |
| 2011/0141074 A1* | 6/2011 | Koo ............ 345/205 |
| 2011/0221715 A1* | 9/2011 | Yang et al. ............ 345/204 |

* cited by examiner

LIQUID CRYSTAL DISPLAY HAVING MINIMIZED BEZEL AREA

CROSS-REFERENCE TO RELATED APPLICATION

This application claims priority to and benefit of Korean Patent Application No. 10-2011-0104248 filed on Oct. 12, 2011, which is herein incorporated by reference in its entirety.

BACKGROUND OF THE INVENTION

1. Technical Field

The present inventive concept relates to a liquid crystal display. More particularly, the present inventive concept relates to a liquid crystal display having a minimized bezel area.

2. Description of the Related Art

In general, a liquid crystal display includes a display panel, gate and data drivers driving the display panel, and a backlight unit providing light to the display panel. The display panel includes a first substrate, a second substrate facing the first substrate, and a liquid crystal layer interposed between the first and second substrates. The first substrate serves as a thin film transistor substrate, and the second substrate serves as a color filter substrate.

The thin film transistor substrate includes gate lines, data lines crossing the gate lines, and pixels each connected to a corresponding gate line of the gate lines and a corresponding data line of the data lines. In addition, a data driver is disposed adjacent to an upper or lower side of the thin film transistor substrate, and a gate driver is disposed adjacent to a left or right side of the thin film transistor substrate. The data driver includes source driving chips to apply signals to the data lines, and the gate driver includes gate driving chips to apply signals to the gate lines. The source and gate driving chips are disposed adjacent to or mounted on the thin film transistor substrate by a chip-on-film system or a chip-on-glass system.

The color filter substrate includes plural color pixels, e.g., red, green, and blue color pixels, to display colors corresponding to amounts of the light, which are varied according to the arrangement of liquid crystal molecules of the liquid crystal layer.

The thin film transistor substrate is divided into a display area in which the pixels are arranged and a non-display area surrounding the display area. If the non-display area is increased, a bezel area covering the outside of the liquid crystal display to correspond to the non-display area is typically increased. Given a total area, the non-display area is required to be decreased so as to enlarge the display area.

Recently, an amorphous silicon gate (ASG) driver, which is directly formed on the thin film transistor substrate, has been widely used instead of conventional gate driving chips. Nevertheless, a thin film transistor substrate that includes the ASG driver may require a larger non-display area than a thin film transistor substrate that includes gate driving chips. Thus, there may be difficulties in reducing the non-display area and/or the bezel area when employing the ASG driver.

In addition, as the number of the pixels is increased, the number of the data lines is increased. As a result, the number of the source driving chips may need to be increased, and the cost of the liquid crystal display may be increased.

SUMMARY OF THE INVENTION

Embodiments of the present inventive concept are related to a liquid crystal display having a narrow bezel with a minimized bezel area.

According to one or more embodiments, a liquid crystal display includes a first substrate including a plurality of pixels arranged in m columns by n rows, n data lines disposed on the first substrate and disposed substantially parallel to the columns, m gate lines arranged substantially parallel to the data lines, n data distribution lines arranged to cross the m gate lines and vertically and electrically connected to the data lines, respectively, source driving chips disposed on a first portion of the first substrate, and a gate driver disposed on a second portion of the first substrate, which is opposite to the first portion.

Each of the data distribution lines is electrically connected to a subset of the pixels arranged in a corresponding row, and each of the gate lines is electrically connected to a subgroup of the pixels arranged in a corresponding column. The source driving chips apply data signals to the pixels through the data lines and the data distribution lines, and the gate driver applies gate signals to the pixels through the gate lines.

According to one or more embodiments, a liquid crystal display includes a first substrate including a plurality of pixels arranged in m columns by n rows, m data lines disposed on the first substrate and disposed substantially parallel to the rows, n gate lines arranged substantially parallel to the data lines, m data distribution lines arranged to cross the m gate lines and vertically and electrically connected to the data lines, respectively, source driving chips disposed on a first portion of the first substrate, and gate driving chips disposed on a second portion of the first substrate, which is opposite to the first portion.

Each of the data distribution lines is electrically connected to a subset of the pixels arranged in a corresponding column, and each of the gate lines is electrically connected to a subgroup of the pixels arranged in a corresponding row. The source driving chips apply data signals to the pixels through the data lines and the data distribution lines, and the gate driving chips apply gate signals to the pixels through the gate lines.

According to one or more embodiments, a liquid crystal display includes a first substrate including a plurality of pixels arranged in m columns by n rows, n/2 data lines disposed on the first substrate and disposed substantially parallel to the columns, 2 m gate lines arranged substantially parallel to the data lines, n/2 data distribution lines arranged to cross the 2 m gate lines and vertically and electrically connected to the data lines, respectively, source driving chips disposed on a first portion of the first substrate, and a gate driver disposed on a second portion of the first substrate, which is opposite to the first portion.

Each of the data distribution lines is disposed between a subset of the pixels arranged in an odd-numbered row and a subset of the pixels arranged in an even-numbered row and electrically connected to the subsets of the pixels arranged in the odd- and even-numbered rows, and each of the gate lines is electrically connected to a subgroup of the pixels arranged in a corresponding column. Two gate lines adjacent to each other among the gate lines are respectively disposed at left and right sides of a same subgroup of the pixels arranged in the same column. One gate line of the two adjacent gate lines is electrically connected to odd-numbered pixels arranged in the same column, and the other gate line of the two adjacent gate lines is electrically connected to even-numbered pixels arranged in the same column. The source driving chips apply data signals to the pixels through the data lines and the data distribution lines, and the gate driver applies gate signals to the pixels through the gate lines.

According to embodiments of the inventive concept, a third portion of the first substrate and a fourth portion of the first substrate do not bear important components of the liquid crystal display. Therefore, the areas of the third and fourth portions may be minimized. Accordingly, given a constant size of the first substrate, a bezel area of the liquid crystal display may be minimized, and thus a display area of the liquid crystal display may be advantageously widened. In addition, the number of the source driving chips employed in the liquid crystal display is reduced; advantageously, the manufacturing cost and/or the material cost of the liquid crystal display may be reduced.

BRIEF DESCRIPTION OF THE DRAWINGS

The above and other advantages of the present inventive concept will become readily apparent by reference to the following detailed description when considered in conjunction with the accompanying drawings wherein.

DETAILED DESCRIPTION

Figure 1:
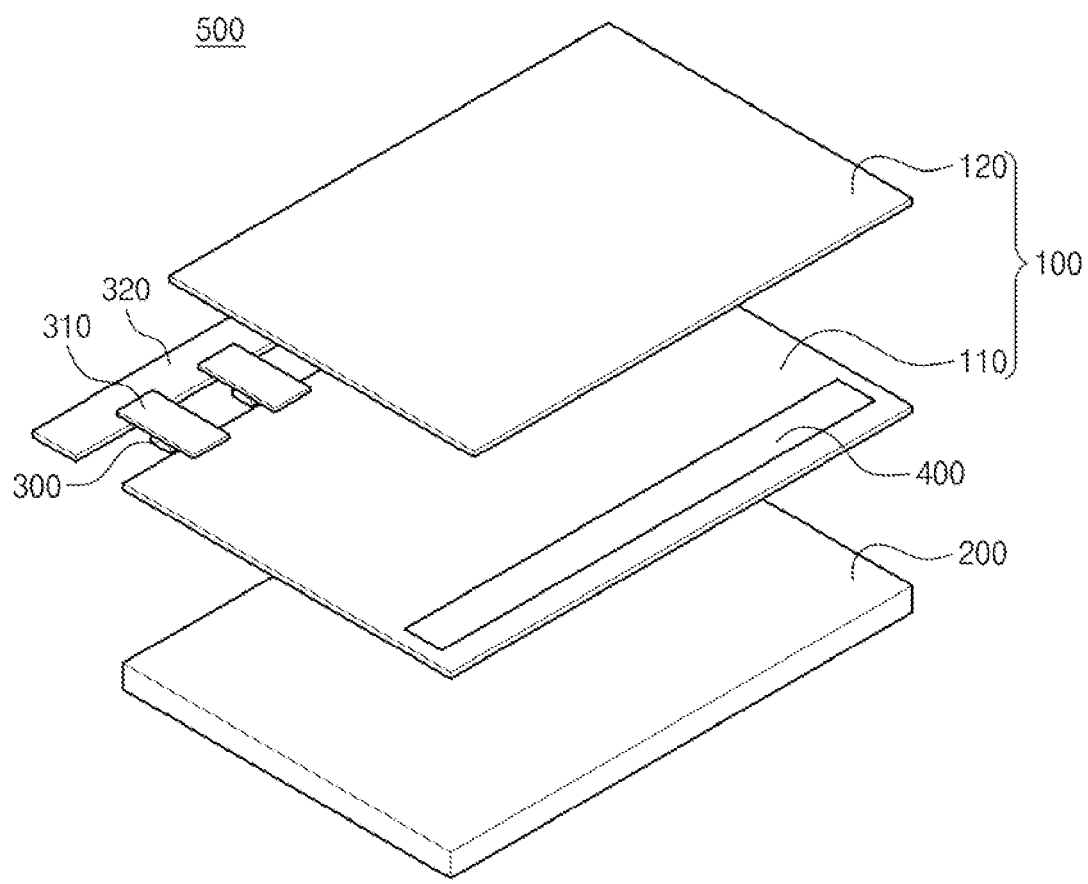
FIG. 1 is an exploded perspective view illustrating a liquid crystal display according to an embodiment of the present inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or subgroups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present inventive concept will be explained in detail with reference to the accompanying drawings.

Figure 2:
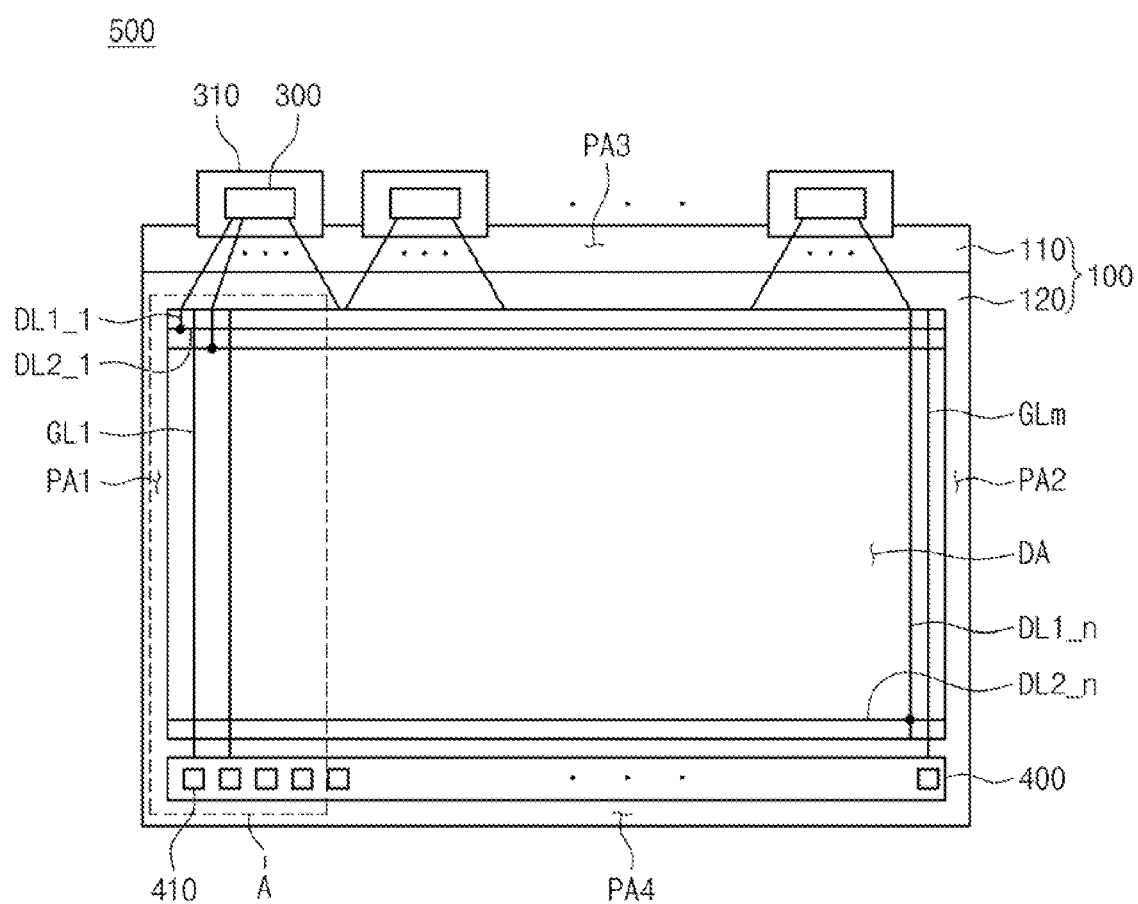
FIG. 2 is a plan view showing the liquid crystal display shown in FIG. 1.

FIG. 1 is an exploded perspective view illustrating a liquid crystal display according to a first embodiment of the present inventive concept, and FIG. 2 is a plan view showing the liquid crystal display shown in FIG. 1.

Referring to FIGS. 1 and 2, a liquid crystal display 500 includes a display panel 100, a gate driver 400, a plurality of source driving chips 300, a plurality of films 310 on which the source driving chips 300 are respectively mounted, a driving circuit board 320, and a backlight unit 200. The source driving chips 300 are configured to be run as a data driver. That is, the data driver includes the source driving chips 300. The gate driver 400 includes a plurality of amorphous silicon gate circuits 410 (hereinafter, referred to as ASG circuits).

The display panel 100 includes a first substrate 110 on which a plurality of pixels is formed, a second substrate 120 facing the first substrate 110, and a liquid crystal layer (not shown) interposed between the first and second substrates 110 and 120. The first substrate 110 is referred to as a thin film transistor substrate, and the second substrate 120 is referred to as a color filter substrate 120.

The backlight unit 200 provides a light to the display panel 100, and the liquid crystal layer controls a transmittance of the light provided by the backlight unit 200. The color filter substrate 120 includes a plurality of color pixels (not shown), e.g., a red color pixel, a green color pixel, and a blue color pixel, which correspond to the pixels in a one-to-one correspondence. The light passing through the liquid crystal layer has its colors determined by the color pixels.

The pixels are disposed on the thin film transistor substrate 110 and arranged in m columns by n rows. In the present embodiment, m and n are integers greater than zero (0). In addition, each pixel includes a thin film transistor and a pixel electrode.

First data lines DL1_1 to DL1_n (hereinafter, referred to as data lines) are substantially vertically and electrically connected to second data lines DL2_1 to DL2_n (hereinafter, referred to as data distribution lines). The data distribution lines DL2_1 to DL2_n cross the gate lines GL1 to GLm, and the gate lines GL1 to GLm are disposed substantially parallel to the data lines DL1_1 to DL1_n. The pixels are connected to the data distribution lines DL2_1 to DL2_n and the gate lines DL1 to DLm. In detail, each of the data distribution lines DL2_1 to DL2_n is connected to the pixels arranged in a corresponding row, and each of the gate lines GL1 to GLm is connected to the pixels arranged in a corresponding column. The data distribution lines DL2_1 to DL2_n are arranged in a row direction, and the data lines DL1_1 to DL1_n and the gate lines GL1 to GLm are arranged in a column direction.

The ASG circuits 410 of the gate driver 400 are mounted on the lower portion of the thin film transistor substrate 110 to apply gate signals, e.g., gate on/off signals, to the pixels through the gate lines GL1 to GLm. In the present embodiment, since the number of the ASG circuits 410 corresponds to the number of the gate lines GL1 to GLm, m ASG circuits 410 are mounted on the lower portion of the thin film transistor substrate 110.

The source driving chips 300 are mounted on the upper portion of the thin film transistor substrate 110 in a chip-on-film (COF) manner. In detail, the source driving chips 300 are mounted on signal transmission films 310, respectively, in a tape carrier package format. The source driving chips 300 are electrically connected between the upper portion of the thin film transistor substrate 110 and the driving circuit board 320 through the signal transmission films 310. In addition, the source driving chips 300 transmit data signals (or pixel data) through the data lines DL1_1 to DL1_n. In one or more embodiments, each source driving chip 300 transmits data signals through a plurality of data lines. The data signals are applied to the pixels through the data distribution lines DL2_1 to DL2_n respectively connected to the data lines DL1_1 to DL1_n. In other words, the data signals are applied to the pixels row-by-row. The connection configuration of the data lines DL1_1 to DL1_n, the data distribution lines DL2_1 to DL2_n, the gate lines GL1 to GLm, and the pixels will be described in detail with reference to FIG. 3.

An area in which the pixels are arranged is referred to as a display area DA, and an area surrounding the display area DA is referred to as a non-display area. The non-display area includes a first area PA1 disposed adjacent to a left side of the display area DA (between a left edge of the thin film transistor substrate 110 and the display area DA), a second area PA2 disposed adjacent to a right side of the display area DA (between a right edge of the thin film transistor substrate 110 and the display area DA), a third area PA3 disposed adjacent to an upper side of the display area DA (between an upper edge of the thin film transistor substrate 110 and the display area DA), and a fourth area PA4 disposed adjacent to a lower side of the display area DA (between a lower edge of the thin film transistor substrate 110 and the display area DA). As shown in FIG. 2, since the ASG circuits 410 of the gate driver 400 are disposed in the lower portion of the thin film transistor substrate 110, the first area PA1 and the second area PA2 may be minimized. In one or more embodiments, the distance between the left edge of the thin film transistor substrate 110 and a pixel of the plurality of pixels is less than or equal to 1 mm, and/or the distance between the right edge of the thin film transistor substrate 110 and another pixel of the plurality of pixels is less than or equal to 1 mm. For example, each of the first and second areas PA1 and PA2 of the non-display area has a width of about 1 mm. In addition, since the ASG circuits 410 are mounted in place of cell gap compensation patterns for the lower portion of the thin film transistor substrate 110, of the size of the fourth area PA4 may be maintained or minimized.

Consequently, the bezel area (e.g., the first and second areas PA1 and PA2) in the left and right sides of the liquid crystal display 500 may be reduced, so the display area DA may be widened in the left and right side directions in which the first and second areas PA1 and PA2 are respectively positioned.

Figure 3:
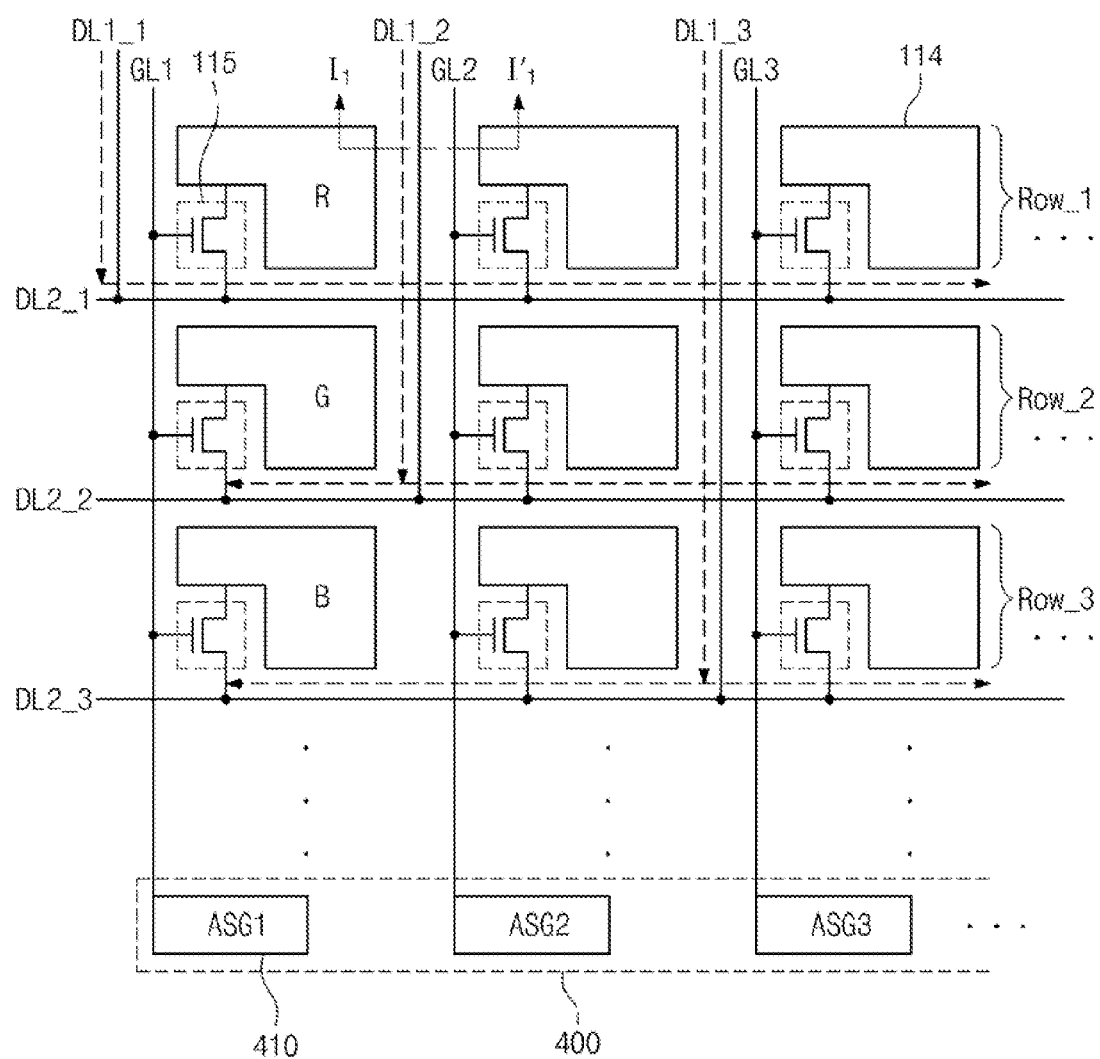
FIG. 3 is an enlarged view showing a portion A shown in FIG. 2.

FIG. 3 is an enlarged view showing a portion A shown in FIG. 2. For convenience of explanation, nine pixels have been shown in FIG. 3, and a dotted arrow line indicates a movement direction of data.

Referring to FIG. 3, the pixels are configured to include red, green, and blue pixels arranged along the column direction. Each of the pixels includes a thin film transistor 115 and a pixel electrode 114. Each of the data lines DL1_1 to DL1_n is substantially vertically and electrically connected to a corresponding data distribution line of the data distribution lines DL2_1 to DL2_n. Each of the data distribution lines DL2_1 to DL2_n is electrically connected to source electrodes of the thin film transistors 115 of the pixels arranged in a corresponding row. Each of gate lines GL1 to GLm is connected to gate electrodes of the thin film transistors 115 of the pixels arranged in a corresponding column. Drain electrodes of the thin film transistors 115 of the pixels are connected to the pixel electrodes 114, respectively.

The data signal provided through the data line DL1_1 is applied to the source electrodes of the thin film transistors 115 of the pixels arranged in a first row Row_1 through the data distribution line DL2_1. The data signal provided through the data line DL1_2 is applied to the source electrodes of the thin film transistors 115 of the pixels arranged in a second row Row_2 through the data distribution line DL2_2. Similarly, the data signals provided through the data lines DL1_3 to DL1_n are applied to the source electrodes of the thin film transistors 115 of the pixels arranged in the corresponding rows through the data distribution lines DL2_3 to DL2_n, respectively.

As described above, since the data signal is applied to the pixels arranged in one row through one data distribution line connected to one data line, n data lines are provided on the display panel 100.

Each of the ASG circuits 410 applies the gate signal to the gate electrodes of the thin film transistors 115 of the pixels arranged in the corresponding column through the corresponding gate line of the gate lines GL1 to GLm. Thus, m gate lines are provided on the display panel 100.

If a typical prior art LCD has a resolution of 1366 by 768, the number of the data lines may be 1366×3, and the number of the gate lines may be 768. But, if the liquid crystal display 500 has a resolution of 1366 by 768, the number of the data lines may be 768×3 (corresponding to 768 subsets of R-G-B rows), and the number of the gate lines may be 1366. Thus, the number of the data lines and the number of the source driving chips may be minimized.

Consequently, the non-display area of the liquid crystal display 500 may be minimized, and thus the bezel area may be minimized. In addition, the number of the source driving chips may be minimized; advantageously, the manufacturing cost of the liquid crystal display 500 may be reduced.

Figure 4:
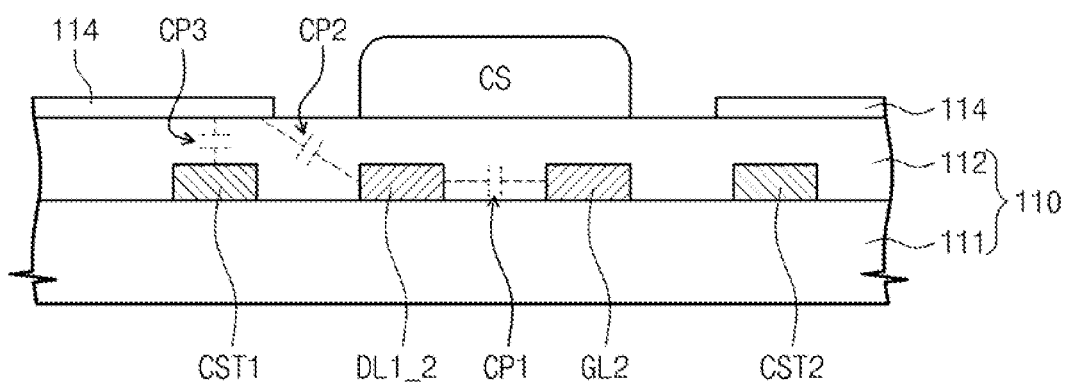
FIG. 4 is a cross-sectional view taken along a line I1-I'1 shown in FIG. 3.

FIG. 4 is a cross-sectional view taken along a line I1-I1' shown in FIG. 3. For convenience of explanation, a first storage capacitor line (hereinafter referred to as first CST line) CST1, a second storage capacitor line (hereinafter referred to as second CST line) CST2, and a column spacer CS, which are not shown in FIG. 3, are illustrated in FIG. 4.

Referring to FIG. 4, the thin film transistor substrate 110 includes a first base substrate 111 and a gate insulating layer 112. The first CST line CST1, the second CST line CST2, and the gate line GL2 are disposed on the first base substrate 111. The data line DL1_2 and the gate line GL2 are spaced apart from each other and disposed between the first and second CST lines CST1 and CST2. The data line DL1_2 and the gate line GL2 are formed of the same metal material.

The gate insulating layer 112 is disposed on the first base substrate 111 to cover the first CST line CST1, the data line DL1_2, the gate line GL2, and the second CST line CST2. The pixel electrode 114 overlapping the first CST line CST1 and the pixel electrode 114 overlapping the second CST line CST2 are disposed on the gate insulating layer 112 and are spaced apart from each other. Hereinafter, the pixel electrode 114 overlapped with the first CST line CST1 is referred to as a first pixel electrode, and the pixel electrode 114 overlapped with the second CST line CST2 is referred to as a second pixel electrode. The column spacer CS is disposed between the first and second pixel electrodes 114 and overlaps the data line DL1_2 and the gate line GL2.

A first parasitic capacitor CP1 is formed by the data line DL1_2 and the gate line GL2 with a first parasitic capacitance existing between the data line DL1_2 and the gate line GL2, a second parasitic capacitor CP2 is formed between/by the first pixel electrode and the data line DL1_2, and a storage capacitor CP3 is formed between/by the first pixel electrode and the first CST line CST1. The first and second parasitic capacitors CP1 and CP2 may exert influence on the operation of the display panel 100.

The column spacer CS includes a material having a low dielectric constant. In an embodiment, the column spacer CS includes an epoxy-based acrylic resin, and the dielectric constant of the column spacer CS is lower than that of the liquid crystal molecules of the liquid crystal layer. The first parasitic capacitor CP1 formed between/by the data line DL1_2 and the gate line GL2 has a capacitance proportional to the dielectric constant of the column spacer CS. When a voltage is applied to the substrates, the liquid crystal molecules of the liquid crystal layer are rearranged and the dielectric constant of the rearranged liquid crystal molecules becomes high. However, the dielectric constant of the column spacer CS is lower than the dielectric constant of the liquid crystal molecules. Thus, although the dielectric constant of the liquid crystal molecules becomes high, the capacitance of the first parasitic capacitor CP1 remains small due to the column spacer CS having the low dielectric constant.

In addition, as the data line DL1_2 and the gate line GL2 are far away from each other, the capacitance of the first capacitor CP1 becomes small. In an embodiment, if the distance between the data line DL1_2 and the gate line GL2 is equal to or greater than four micrometers, the capacitance of the first parasitic capacitor CP1 may be negligible.

The storage capacitor CP3 compensates for electric charges discharged from a liquid crystal capacitor defined by the first pixel electrode and a common electrode (not shown) disposed on the color filter substrate 120. In an embodiment, the capacitance of the storage capacitor CP3 is greater than that of the second parasitic capacitor CP2, and thus the capacitance of the second parasitic capacitor CP2 can be disregarded.

In an embodiment, the influences by the first and second parasitic capacitors CP1 and CP2 on the operation of the display panel 100 may be disregarded.

Figure 5A:
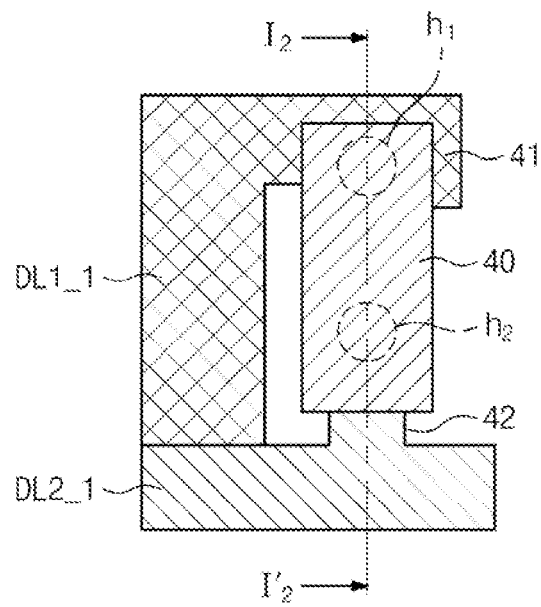
FIG. 5A is a plan view showing a connection of a data line and a data distribution line shown in FIG. 3 according to an embodiment of the present inventive concept.
Figure 5B:
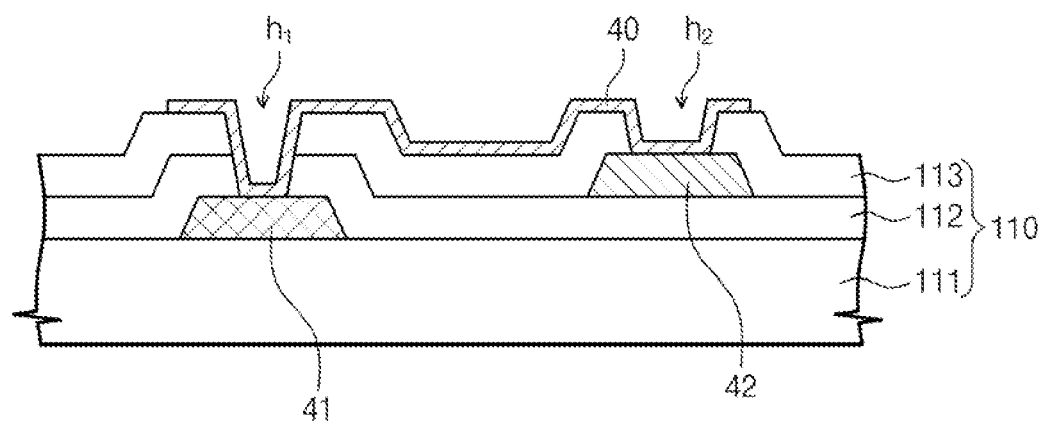
FIG. 5B is a cross-sectional view taken along a line I2-I'2 shown in FIG. 5A.

FIG. 5A is a plan view showing a connection of a data line and a data distribution line shown in FIG. 3 according to an embodiment of the present inventive concept, and FIG. 5B is a cross-sectional view taken along a line I2-I'2 shown in FIG. 5A. FIGS. 5A and 5B show one data line DL1_1 and one data distribution lien DL2_1 as a representative example.

Referring to FIGS. 5A and 5B, the thin film transistor substrate 110 includes the first base substrate 111, the gate insulating layer 112, and an inter-insulating layer 113. A first branch portion 41 branched from the data line DL1_1 in the row direction is disposed on the first base substrate 111. The gate insulating layer 112 is disposed on the first base substrate 111 to cover the first branch portion 41, and a second branch portion 42 branched from the data distribution line DL2_1 in the column direction is disposed on the gate insulating layer 112 to be adjacent to the first branch portion 41. The inter-insulating layer 113 is disposed on the gate insulating layer 112 to cover the second branch portion 42. A first hole h1 is formed through the inter-insulating layer 113 and the gate insulating layer 112 to expose a portion of the first branch portion 41, and a second hole h2 is formed through the inter-insulating layer 113 to expose a portion of the second branch portion 42. A bridge 40 includes portions formed in the first hole h1, formed in the second hole h2, and formed on the inter-insulating layer 113 between the first and second holes h1 and h2, respectively; the first branch portion 41 and the second branch portion 42 are electrically connected to each other by the bridge 40.

In the example of FIGS. 5A and 5B, the first branch portion 41 and the second branch portion 42 are disposed on different layers from each other and are electrically connected to each other by the bridge 40.

Figure 6A:
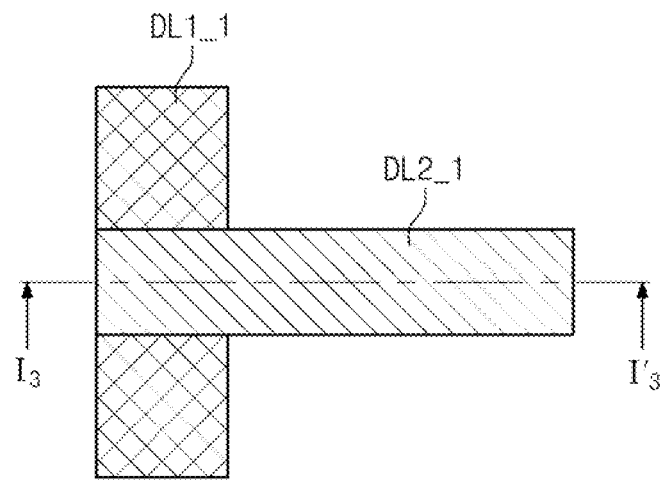
FIG. 6A is a plan view showing a connection of a data line and a data distribution line shown in FIG. 3 according to an embodiment of the present inventive concept.
Figure 6B:
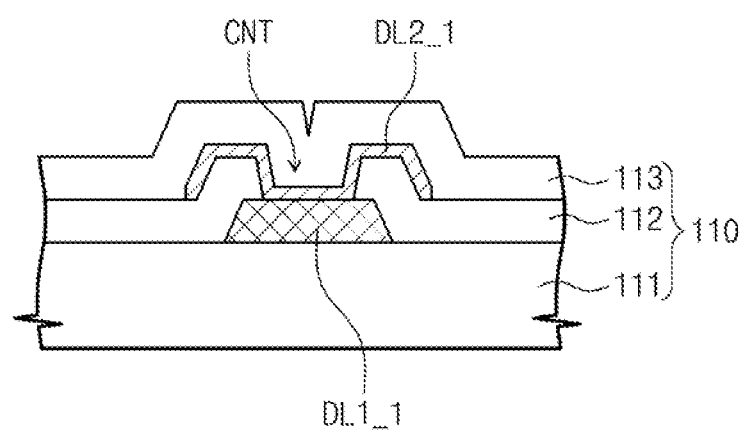
FIG. 6B is a cross-sectional view taken along a line I3-I'3 shown in FIG. 6A.

FIG. 6A is a plan view showing a connection of a data line and a data distribution line shown in FIG. 3 according to an embodiment of the present inventive concept, and FIG. 6B is a cross-sectional view taken along a line I3-I'3 shown in FIG. 6A. FIGS. 6A and 6B show one data line DL1_1 and one data distribution line DL2_1 as a representative example.

Referring to FIGS. 6A and 6B, the data line DL1_1 is disposed on the first base substrate 111, and the gate insulating layer 112 is disposed on the first base substrate 111 to cover the data line DL1_1. The gate insulating layer 112 is provided with a contact hole CNT formed therethrough to expose a portion of the data line DL1_1. The data distribution line DL2_1 includes portions disposed in the contact hole CNT and disposed on a portion of the gate insulating layer 112 adjacent to the contact hole CNT, respectively, and the inter-insulating layer 113 is disposed on the gate insulating layer 112 to cover the data distribution line DL2_1. Since a portion of the data distribution line DL2_1 is disposed in the contact hole CNT, the data line DL1_1 and the data distribution line DL2_1 are electrically connected to each other.

The contact hole CNT is formed only in an area where the data line DL1_1 is connected to the data distribution line DL2_1. For instance, the data line DL1_1 is connected to the data distribution line DL2_1, but another data line DL1_2 is not connected to the data distribution line DL2_1. That is, the contact hole CNT is not formed in the gate insulating layer 112 disposed corresponding to the data line DL1_2. Accordingly, the data line DL1_2 is separated from the data distribution line DL2_1 by the gate insulating layer 112 so as not to be electrically connected to the data distribution line DL2_1.

Figure 7:
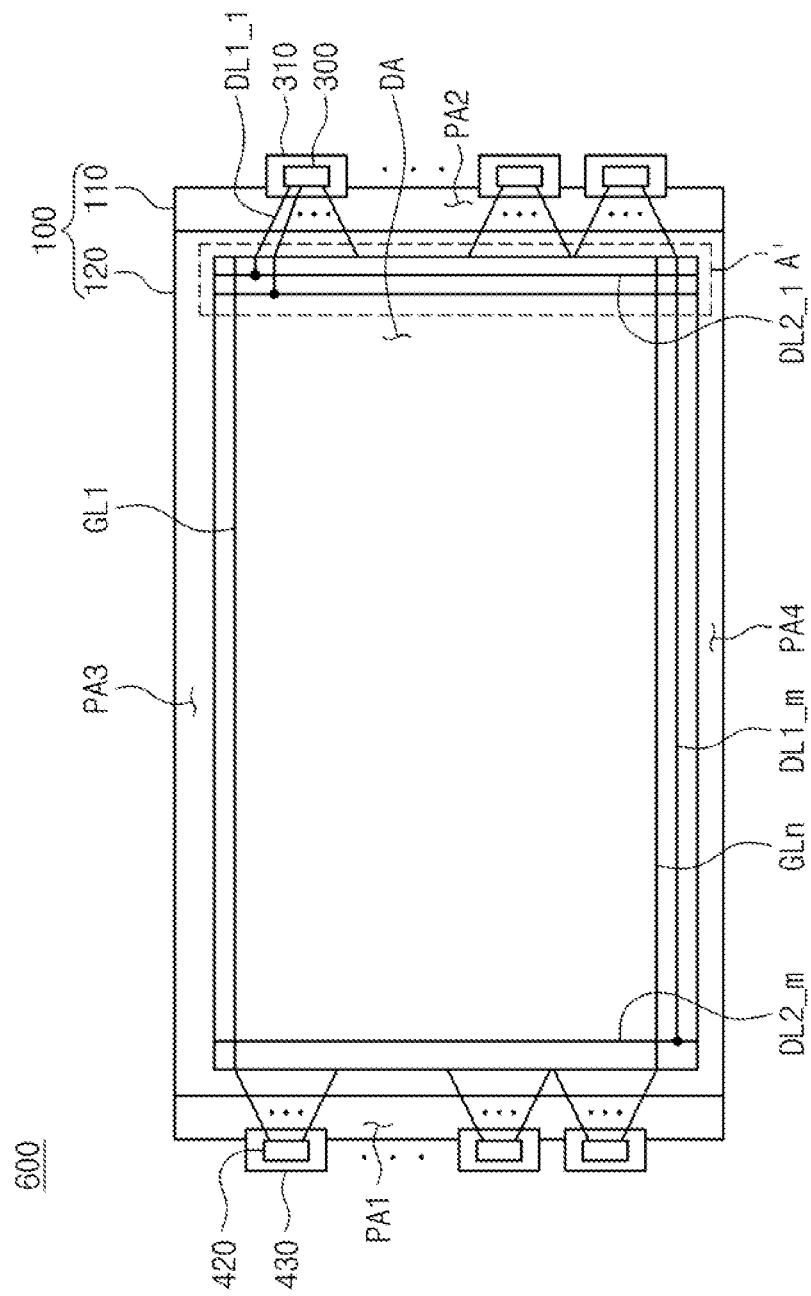
FIG. 7 is a plan view illustrating a liquid crystal display according to an embodiment of the present inventive concept.

FIG. 7 is a plan view showing a liquid crystal display according to an embodiment of the present inventive concept. In FIG. 7, the same reference numerals may denote the same elements in FIG. 2, and thus detailed descriptions of the same elements may be omitted. In a liquid crystal display 600 according to an embodiment, a gate driver includes a plurality of gate driving chips 420 and is disposed adjacent to a left side of the thin film transistor substrate 110, and source driving chips 300 are disposed adjacent to a right side of the thin film transistor substrate 110. In addition, the connection configuration of data lines, data distribution lines, and gate lines is different from that of the data lines, data distribution lines, and the gate lines shown in FIG. 2 since the gate driving chips and the source driving chips are disposed adjacent to the left and right sides of the thin film transistor substrate 110, respectively. In one or more embodiments, the left and right sides of the thin film transistor substrate 110 are shorter than the upper and lower sides of the thin film transistor substrate 110.

Referring to FIG. 7, the data lines DL1_1 to DL1_m are substantially vertically and electrically connected to second data lines DL2_1 to DL2_m (hereinafter, referred to as data distribution lines), respectively. The data distribution lines DL2_1 to DL2_m cross the gate lines GL1 to GLn, and the gate lines GL1 to GLn are disposed substantially parallel to the data lines DL1_1 to DL1_m. Pixels are connected to the data distribution lines DL2_1 to DL2_m and the gate lines GL1 to GLn in a one-to-one correspondence. In detail, each of the data distribution lines DL2_1 to DL2_m is connected to the pixels arranged in a corresponding column, and each of the gate lines GL1 to GLn is connected to the pixels arranged in a corresponding row. The data distribution lines DL2_1 to DL2_m are arranged in the column direction, and the data lines DL1_1 to DL1_m and the gate lines GL1 to GLn are arranged in the row direction.

The gate driving chips 420 are connected to the left side of the thin film transistor substrate 110 in the chip-on-film manner, and the source driving chips 300 are connected to the right side of the thin film transistor substrate 110 in the chip-on-film manner. The gate driving chips 420 are configured to serve the gate driver. That is, the gate driver includes the gate driving chips 420.

The gate driving chips 420 apply gate signals, e.g., gate on/off signals, to the pixels through the gate lines GL1 to GLn by rows.

The source driving chips 300 transmit data signals, e.g., the pixel data, through the data lines DL1_1 to DL1_m. Each source driving chip 300 transmits data signals to a plurality of data lines. The data signals are applied to the pixels through the data distribution lines DL2_1 to DL2_m respectively connected to the data lines DL1_1 to DL1_m. That is, the data signals are applied to the pixels by columns. The connection configuration of the data lines DL1_1 to DL1_m, the data distribution lines DL2_1 to DL2_m, the gate lines GL1 to GLn, and the pixels will be described in detail with reference to FIG. 8.

As described above, since the gate driving chips 420 of the gate driver are disposed at the left side of the thin film transistor substrate 110, and the source driving chips 300 of the data driver are disposed at the right side of the thin film transistor substrate 110, the size of at least one of the third area PA3 and the fourth area PA4 may be minimized. In one or more embodiments, the distance between the upper edge of the thin film transistor substrate 110 and a pixel of the plurality of pixels is less than or equal to 1 mm, and/or the distance between the lower edge of the thin film transistor substrate 110 and another pixel of the plurality of pixels is less than or equal to 1 mm. For example, the third and fourth areas PA3 and PA4 may have the size of about 1 mm in width.

In addition, since the gate driving chips 420 are employed in the thin film transistor substrate 110 instead of the ASG circuits 410, the size of the first area PA1 may be even smaller than a left-side non-display area including ASG circuits 410 mounted thereon. In one or more embodiments, the gate driving chips 420 of the gate driver are disposed at the right side of the thin film transistor substrate 110, and the source driving chips 310 of the data driver are disposed at the left side of the thin film transistor substrate 110; the size of at least one of the third area PA3 and the fourth area PA4 may be minimized. Further, the size of the second area PA2 may be even smaller than a right-side non-display area including ASG circuits 410 mounted thereon (since the gate driving chips 420 are employed in the thin film transistor substrate 110 instead of the ASG circuits 410).

Consequently, the upper and lower bezel areas of the liquid crystal display 600 according to the present embodiment may be minimized, and the left and right bezel areas of the liquid crystal display 600 may be smaller than left and right bezel areas associated with ASG circuits 410.

Figure 8:
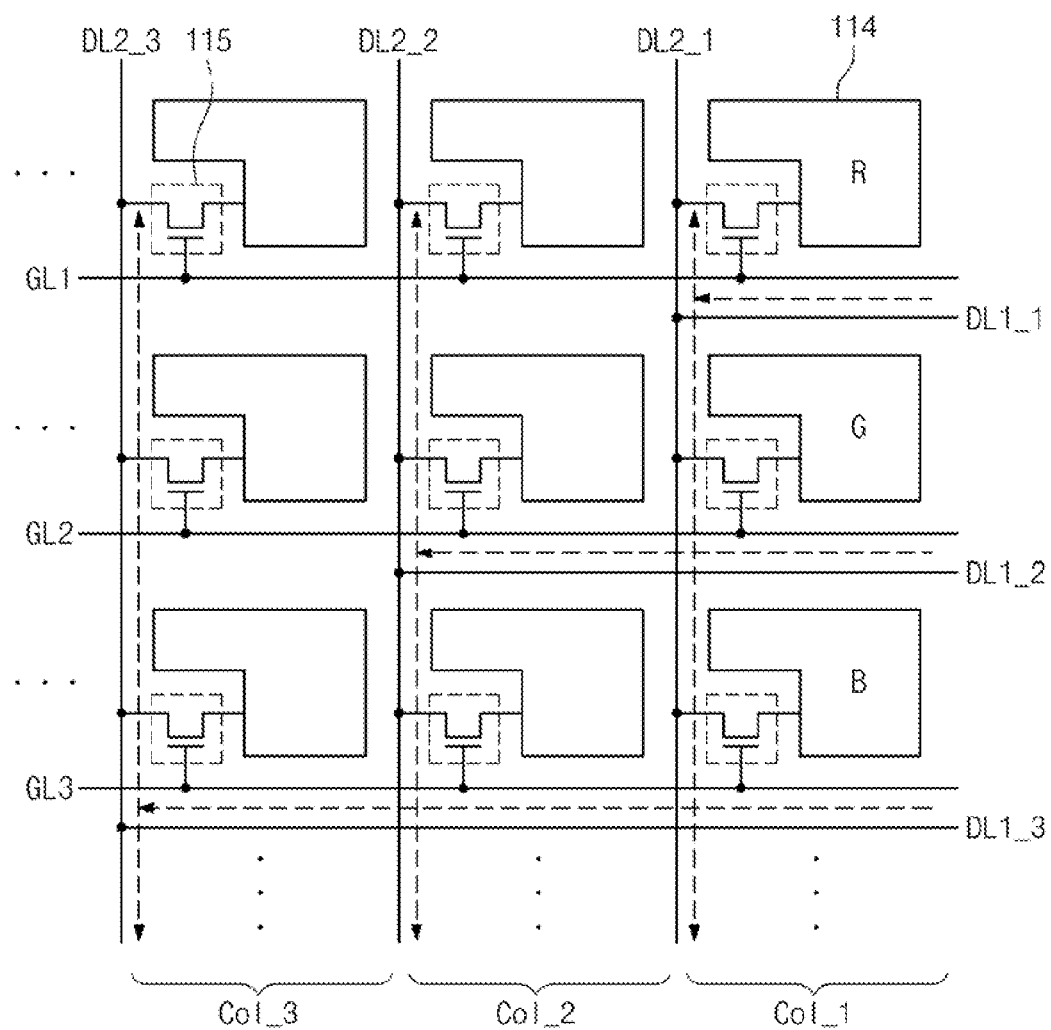
FIG. 8 is an enlarged view showing a portion A' shown in FIG. 7.

FIG. 8 is an enlarged view showing a portion A' shown in FIG. 7.

Referring to FIG. 8, the data lines DL1_1 to DL1_m are substantially vertically and electrically connected to the data distribution lines DL2_1 to DL2_m. The data distribution lines DL2_1 to DL2_m are electrically connected to the source electrodes of the thin film transistors 115 of the pixels arranged in the corresponding columns, respectively. The gate lines GL1 to GLn are electrically connected to the gate electrodes of the thin film transistors 115 of the pixels arranged in the corresponding rows, respectively. Drain electrodes of the thin film transistors 115 of the pixels are respectively connected to the pixel electrodes 114.

The data signal provided through the data line DL1_1 is applied to the source electrodes of the thin film transistors 115 of the pixels arranged in a first column Col_1 through the data distribution lines DL2_1. The data signal provided through the data line DL1_2 is applied to the source electrodes of the thin film transistors 115 of the pixels arranged in a second column Col_2 through the data distribution lines DL2_2. Similarly, the data signals provided through the data lines DL1_3 to DL1_m are applied to the source electrodes of the thin film transistors 115 of the pixels arranged in the corresponding columns through the data distribution lines DL2_3 to DL2_m.

Since the data signal is applied to the pixels arranged in one column through one data distribution line connected to one data line, m data lines are provided on the display panel 100.

Each of the gate driving chips 420 applies the gate signals to the gate electrodes of the thin film transistors 115 of the pixels arranged in the corresponding row through the corresponding gate line of the gate lines GL1 to GLn. Thus, n gate lines are provided on the display panel 100.

Figure 9:
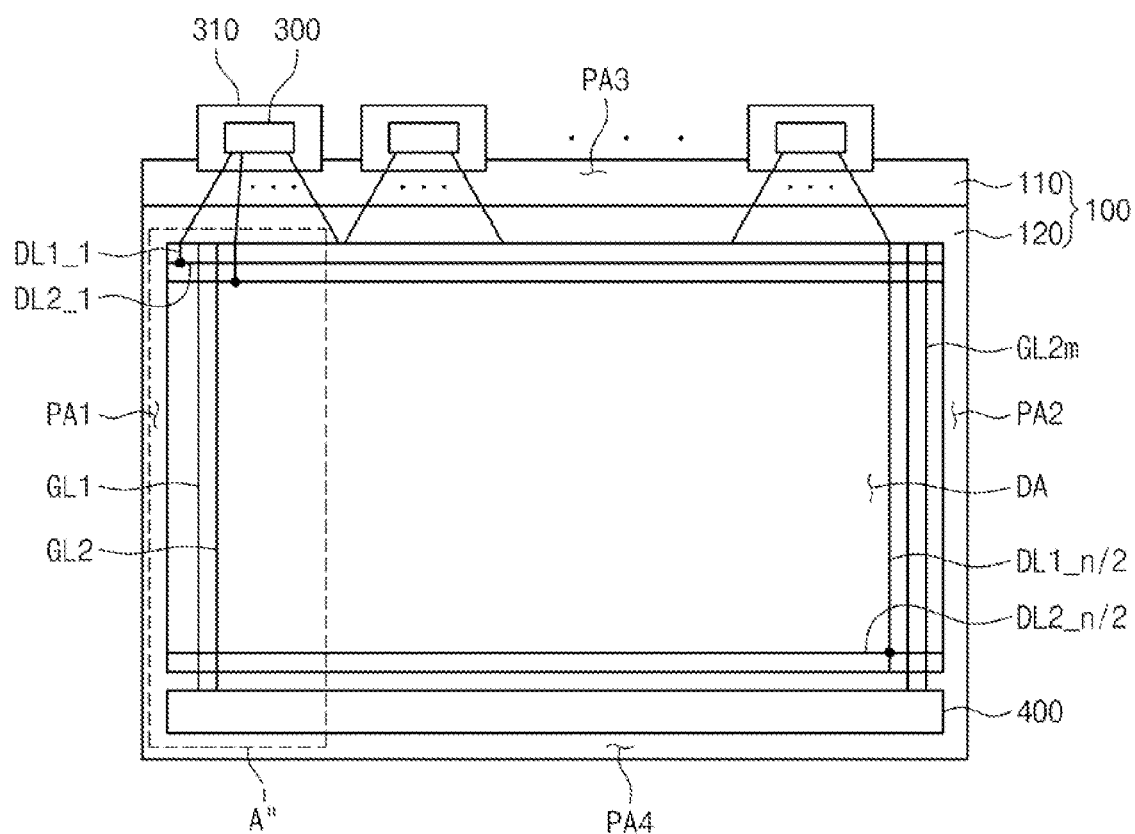
FIG. 9 is a plan view illustrating a liquid crystal display according to an embodiment of the present inventive concept.

FIG. 9 is a plan view showing a liquid crystal display according to an embodiment of the present inventive concept. In FIG. 9, the same reference numerals may denote the same elements in FIG. 2, and thus detailed descriptions of the same elements may be omitted. A liquid crystal display 700 according to the embodiment may have the same structure and function as those of the liquid crystal display 500 shown in FIG. 2 except for the number of the data distribution lines, the number of the gate lines, and the arrangements of the data distribution lines and the gate lines.

The data lines DL1_1 to DL1_n/2 are connected to the data distribution lines DL2_1 to DL2_n/2, respectively. The data distribution lines DL2_1 to DL2_n/2 cross the gate lines GL1 to GL2m, and the gate lines GL1 to GL2m are disposed substantially parallel to the data lines DL1_1 to DL1_n/2.

Each of the data distribution lines DL2_1 to DL2_n/2 is disposed between the pixels arranged in an odd-numbered row and the pixels arranged in an even-numbered row, and thus each of the data distribution lines DL2_1 to DL2_n/2 is connected to the pixels arranged in an odd-numbered row and the pixels arranged in an even-numbered row. The gate lines GL1 to GLm are disposed at left and right sides of the pixels arranged in the same column in the unit of two gate lines, i.e., in gate line pairs. In detail, the two gate lines GL1 and GL2 are disposed at the left and right sides of the pixels arranged in the same column Col_1, respectively, and the two gate lines GL3 and GL4 are disposed at the left and right sides of the pixels arranged in the same column Col_2. Similarly, the other gate lines GL3 to GL2m are disposed in the above-described manner. Among two gate lines, one gate line is connected to odd-numbered pixels in the same column and the other gate line is connected to even-numbered pixels in the same column. The data distribution lines DL2_1 to DL2_n/2 are arranged in the row direction, and the data lines DL1_1 to DL1_n/2 and the gate lines GL1 to GL2m are arranged in the column direction.

The ASG circuits 410 (illustrated in FIG. 10) of the gate driver 400 are mounted on the lower portion of the thin film transistor substrate 110, and the source driving chips 300 are electrically connected between the upper portion of the thin film transistor substrate 110 and the driving circuit substrate 320 (illustrated in FIG. 1) through signal transmission films 310. That is, the arrangements of the ASG circuits 410 and the source driving chips 300 of the liquid crystal display 700 shown in FIG. 9 are the same as those of the liquid crystal display 500 shown in FIG. 2. Thus, the left and right bezel areas of the liquid crystal display 700 may be minimized, thereby widening the display area in the left and right direction.

Figure 10:
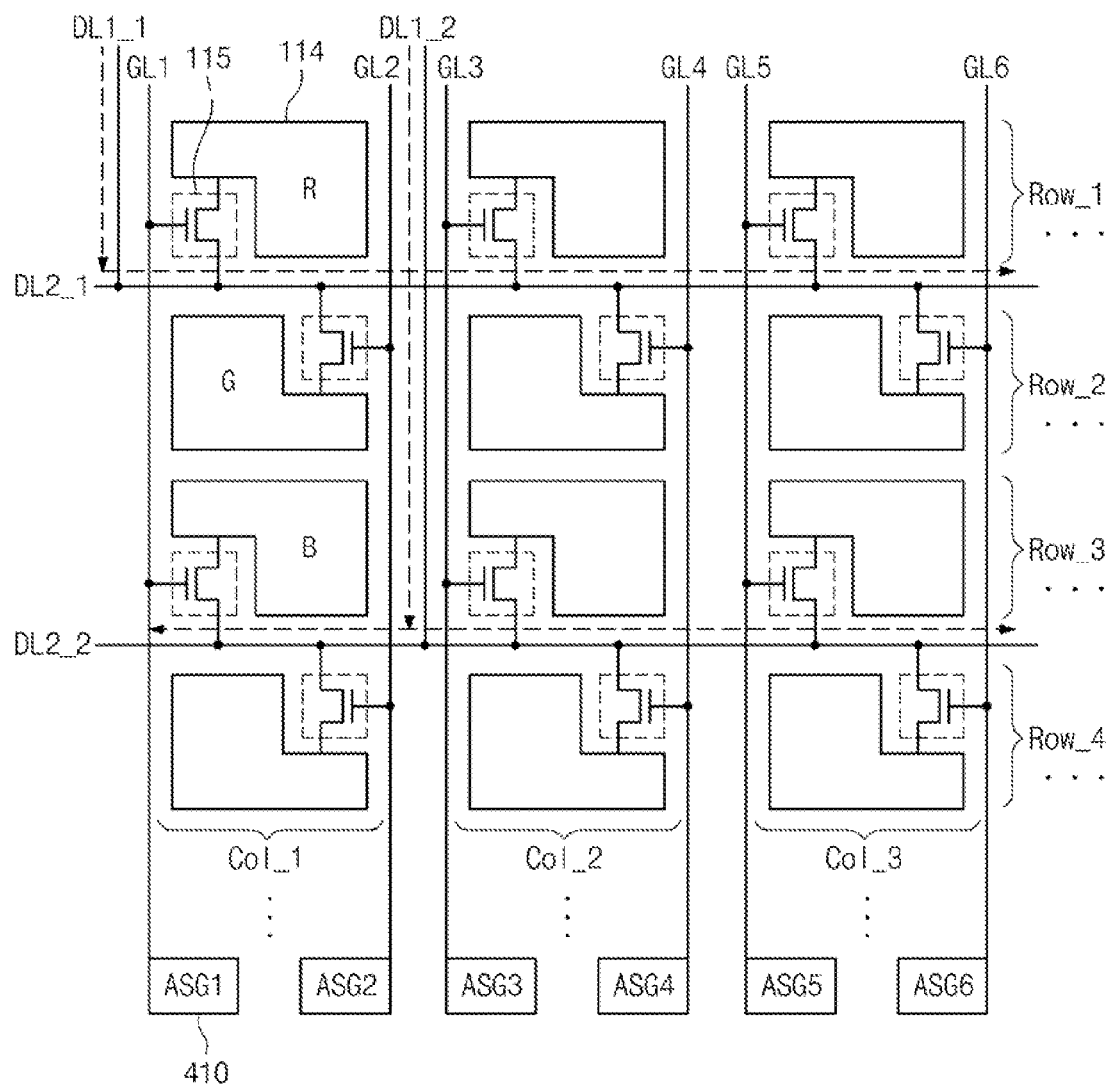
FIG. 10 is an enlarged view showing a portion A" shown in FIG. 9.

FIG. 10 is an enlarged view showing a portion A" shown in FIG. 9. For convenience of explanation, twelve pixels have been shown in FIG. 10, and a dotted arrow line indicates a movement direction of data.

Referring to FIG. 9 and FIG. 10, the data lines DL1_1 to DL1_n/2 are substantially vertically and electrically connected to the data distribution lines DL2_1 to DL2_n/2, respectively.

Each of the data distribution lines DL2_1 to DL2_n/2 is disposed between the odd-numbered row of the pixels and the even-numbered row of the pixels. In addition, each of the data distribution lines DL2_1 to DL2_n/2 is electrically connected to the source electrodes of the thin film transistors 115 of the pixels arranged in the odd- and even-numbered rows. The gate lines GL1 to GL2m are disposed at the left and right sides of the pixels arranged in the same column in the unit of two gate lines, i.e., in pairs. Among two gate lines respectively disposed at the left and right sides of the pixels arranged in the same column, one gate line is electrically connected to the gate electrodes of the thin film transistors 115 of the odd-numbered pixels in the same column, and the other gate line is electrically connected to the gate electrodes of the thin film transistors 115 of the even-numbered pixels in the same column. The drain electrodes of the thin film transistors 115 of the pixels are connected to the pixel electrodes, respectively.

The data signal provided through the data line DL1_1 is applied to the source electrodes of the thin film transistors 115 of the pixels arranged in the first row Row_1 (one of the odd-numbered rows) and the second row Row_2 (one of the even-numbered rows) through the data distribution line DL2_1. In addition, the data signal provided through the data line DL1_2 is applied to the source electrodes of the thin film transistors 115 of the pixels arranged in the third row Row_3 (one of the odd-numbered rows) and the fourth row Row_4 (one of the even-numbered rows) through the data distribution line DL2_2. Similarly, the data signals provided through the data lines DL1_3 to DL1_n/2 are applied to the source electrodes of the thin film transistors 115 of the pixels arranged in the odd- and even-numbered rows through the data distribution lines DL2_3 to DL2_n/2, respectively.

Since a data signal is applied to the pixels arranged in two rows through one data distribution line connected to one data line, n/2 data lines are provided on the display panel 100, wherein n is the number of rows of pixels provided on the display panel 100.

In addition, the gate signal provided through one gate line GL1 of the two gate lines GL1 and GL2 is applied to the gate electrodes of the thin film transistors 115 of the odd-numbered pixels arranged in the first column Col_1. The gate signal provided through the other gate line GL2 of the two gate lines GL1 and GL2 is applied to the gate electrodes of the thin film transistors 115 of the even-numbered pixels arranged in the first column Col_1.

That is, since the gate signal is applied to the pixels arranged in one column through two gate lines, 2 m gate lines are provided on the display panel 100, wherein m is the number of columns of pixels provided on the display panel 100. In addition, since the ASG circuits 410 correspond to the gate lines GL1 to GL2m, 2 m ASG circuits are mounted on the lower portion of the thin film transistor substrate 110.

As described above, the number of the data lines in the liquid crystal display 700 according to the present embodiment is reduced to about half of the number of the data lines in the liquid crystal display 500 shown in FIG. 2, and thus the number of the source driving chips is reduced.

Consequently, the increased bezel area required by the additional m ASG circuits is substantially less than the reduced bezel area caused by the reduced number of source driving circuits. That is, the non-display area of the liquid crystal display 700 may be reduced, and thus the bezel area may be decreased. In addition, the number of the source driving chips may be reduced; advantageously, the manufacturing cost and/or the material cost of the liquid crystal display 700 may be reduced.

Although the embodiments of the present inventive concept have been described, it is understood that the present inventive concept should not be limited to these embodiments but various changes and modifications can be made by one ordinary skilled in the art within the spirit and scope of the present inventive concept as hereinafter claimed.

What is claimed is:

1. A liquid crystal display comprising:
   a first substrate including a plurality of pixels arranged in m columns by n rows;
   n data lines disposed on the first substrate;
   m gate lines arranged substantially parallel to the data lines;
   n data distribution lines arranged to cross the m gate lines and electrically connected to the data lines, respectively;
   source driving chips disposed on a first portion of the first substrate; and
   a gate driver disposed on a second portion of the first substrate, which is opposite to the first portion of the first substrate, wherein each of the data distribution lines is electrically connected to a subset of the pixels arranged in a corresponding row, each of the gate lines is connected to a subgroup of the pixels arranged in a corresponding column, the source driving chips apply data signals to the pixels through the data lines and the data distribution lines, and the gate driver applies gate signals to the pixels through the gate lines.

2. The liquid crystal display of claim 1, wherein the gate driver comprises m amorphous silicon gate circuits each of which applies a gate signal to a corresponding subgroup of the pixels through a corresponding gate line of the gate lines.

3. The liquid crystal display of claim 2, wherein the amorphous silicon gate circuits are disposed on a lower portion of the first substrate.

4. The liquid crystal display of claim 2, wherein
the first substrate comprises:
a first base substrate;
a first branch portion branched from a corresponding data line of the data lines in a row direction and disposed on the first base substrate;
a gate insulating layer disposed on the first base substrate to cover the first branch portion;
a second branch portion branched from a corresponding data distribution line of the data distribution lines in a column direction and disposed on the gate insulating layer to be adjacent to the first branch portion;
an inter-insulating layer disposed on the gate insulating layer to cover the second branch portion; and
a bridge electrically connecting the first branch portion and the second branch portion,
a first hole is formed through the gate insulating layer and the inter-insulating layer to expose the first branch portion,
a second hole is formed through the inter-insulating layer to expose the second branch portion, and
the bridge includes portions disposed in the first hole, disposed in the second hole, and disposed on the inter-insulating layer between the first and second holes.

5. The liquid crystal display of claim 2, wherein the first substrate comprises:
a first base substrate on which the data lines and the gate lines are disposed such that the data lines are spaced apart from the gate lines;
a gate insulating layer disposed on the first base substrate to cover the data lines and the gate lines; and
column spacers disposed on the gate insulating layer, each of the column spacers overlapping a corresponding data line of the data lines and overlapping a corresponding gate line of the gate lines.

6. The liquid crystal display of claim 5, wherein the data lines comprises a same metal material as the gate lines.

7. The liquid crystal display of claim 5, further comprising:
a second substrate facing the first substrate; and
a liquid crystal layer disposed between the first substrate and the second substrate and including liquid crystal molecules, where the column spacer has a dielectric constant lower than a dielectric constant of the liquid crystal molecules.

8. The liquid crystal display of claim 5, wherein the column spacer comprises an epoxy-based acrylic resin.

9. The liquid crystal display of claim 5, wherein each of the data lines is spaced apart from a corresponding gate line of the gate lines by a distance equal to or greater than four micrometers.

10. The liquid crystal display of claim 1, wherein each of the pixels comprises a thin film transistor and a pixel electrode, and each of the data distribution lines is electrically connected to source electrodes of thin film transistors of a corresponding subset of the pixels arranged in the corresponding row.

11. The liquid crystal display of claim 10, wherein each of the gate lines is connected to gate electrodes of thin film transistors of a corresponding subgroup of the pixels arranged in the corresponding column.

12. The liquid crystal display of claim 1, wherein the source driving chips are disposed on an upper portion of the first substrate, the gate driver is disposed on a lower portion of the first substrate, and a distance between a left edge of the first substrate and a pixel of the plurality of pixels is less than or equal to 1 mm.

13. The liquid crystal display of claim 1, wherein
the first substrate comprises:
a first base substrate; and
a gate insulating layer, the data lines are disposed on the first base substrate, the gate insulating layer is disposed on the first base substrate to cover the data lines,
the gate insulating layer includes contact holes that expose the data lines,
the data distribution lines include portions disposed in the contact holes and electrically connected to corresponding data lines of the data lines, respectively.

14. A liquid crystal display comprising:
a first substrate including a plurality of pixels arranged in m columns by n rows;
m data lines disposed on the first substrate;
n gate lines arranged substantially parallel to the data lines;
m data distribution lines arranged to cross the n gate lines and electrically connected to the data lines, respectively;
source driving chips disposed on a first portion of the first substrate; and
gate driving chips disposed on a second portion of the first substrate, which is opposite to the first portion of the first substrate,
wherein each of the data distribution lines is electrically connected to a subset of the pixels among the plurality of pixels arranged in a corresponding column, each of the gate lines is electrically connected to a subgroup of the pixels among the plurality of pixels arranged in a corresponding row, the source driving chips apply data signals to the pixels through the data lines and the data distribution lines, and the gate driving chips apply gate signals to the pixels through the gate lines.

15. The liquid crystal display of claim 14, wherein each of the pixels comprises a thin film transistor and a pixel electrode, and each of the data distribution lines is electrically connected to source electrodes of thin film transistors of a corresponding subset of the pixels arranged in the corresponding column.

16. The liquid crystal display of claim 15, wherein each of the gate lines is connected to gate electrodes of thin film transistors of a corresponding subgroup of the pixels arranged in the corresponding row.

17. The liquid crystal display of claim 14, wherein the source driving chips are disposed on a left portion of the first substrate, the gate driving chips are disposed on a right portion of the first substrate, and a distance between an upper edge of the first substrate and a pixel of the plurality of pixels is less than or equal to 1 mm.

* * * * *